United States Patent [19]
von Alten

[11] Patent Number: 5,813,622
[45] Date of Patent: Sep. 29, 1998

[54] TAPE CARTRIDGE REEL LOCK

[75] Inventor: Thomas W. von Alten, Boise, Id.

[73] Assignee: Hewlett-Packard Company, Palo Alto, Calif.

[21] Appl. No.: 968,060

[22] Filed: Nov. 12, 1997

[51] Int. Cl.[6] ................................... G11B 23/087
[52] U.S. Cl. .................. 242/348; 242/338.1; 242/345.1; 242/343
[58] Field of Search ................. 242/338.1, 343, 242/343.1, 343.2, 348; 360/132

[56] References Cited

U.S. PATENT DOCUMENTS

| | | | |
|---|---|---|---|
| 3,066,880 | 12/1962 | Bauer .................................. | 242/338.1 |
| 4,033,523 | 7/1977 | Roman ................................ | 242/338.1 |
| 5,209,424 | 5/1993 | Fischer et al. ..................... | 242/348 |
| 5,366,173 | 11/1994 | Lammers et al. .................. | 242/338.1 |
| 5,400,981 | 3/1995 | Rambosek et al. ................ | 242/348 |
| 5,436,782 | 7/1995 | Sieben ................................ | 242/338.1 |
| 5,657,937 | 8/1997 | Todd et al. ......................... | 242/345.1 |

FOREIGN PATENT DOCUMENTS

| | | | |
|---|---|---|---|
| 816966 | 8/1937 | France ................................ | 242/338.1 |
| 2 099 399 | 12/1982 | United Kingdom ................ | 242/338.1 |

*Primary Examiner*—John P. Darling

[57] ABSTRACT

A tape cartridge having a reel lock in the hub that is capable of releasing the reel at the same time the drive mechanism engages the hub while minimizing the vertical travel necessary to provide a robust lock. The cartridge includes a housing and a tape reel in the housing. A tape drive interface on the reel, usually a circular gear on the reel hub, is accessible to the drive mechanism on a tape drive through a hole in the bottom of the housing. An arm is mounted in the hub. The arm moves between a first position in which the arm engages the housing to prevent the reel from rotating in at least one direction, and a second position in which the arm does not engage the housing and the reel is free to rotate in both directions.

11 Claims, 4 Drawing Sheets

TAPE CARTRIDGE REEL LOCK

FIELD OF THE INVENTION

The invention relates generally to tape cartridges and, more particularly, to a tape cartridge reel lock that prevents rotation of the tape reel when the cartridge is not installed in a tape drive.

BACKGROUND OF THE INVENTION

A widely used medium for storing data is recording tape, which is typically a polymer tape with a magnetic coating. Tape cartridges are one of the most popular formats for storing data on tape. Tape cartridges are usually smaller and less expensive than reel-to-reel tapes. Two widely used tape cartridges are the dual reel cartridge and the single supply reel cartridge. By enclosing the tape within a cartridge, the tape and the data stored on the tape are better protected from damage than the more exposed reel-to-reel tapes. In a dual reel tape cartridge, both the supply reel and the take-up reel are housed in the cartridge. In a single supply reel tape cartridge, the take-up reel is built into the tape drive along with an automatic tape threading mechanism.

When a tape cartridge is not in use in a tape drive or tape player, it is possible for the reel(s) to rotate idly and cause the tape to lose tension and become partially unwound from the reel. To avoid this problem, tape cartridges usually include some type of reel lock. A variety of reel locks for use in single and dual reel tape cartridges are known in the art. One common type of reel lock uses one or more pawls to engage teeth formed around the outer edge of one of the reel flanges. VHS, Hi-8 and DLT style tape cartridges commonly use this type of lock. In these cartridges, the lock is released as the cartridge is 00installed in the tape drive or player and, therefore, the tape reel may be unlocked before the tape drive engages the reel. The moment at which the tape drive engages the reel and can control the angular position and velocity of the reel is the most desireable time to release the lock. The IBM 3480 single reel cartridge, for example, uses a locking mechanism with mating coaxial gears formed at hub of the reel rather than at the outer edge of the reel. The mating gears are separated to unlock the reel as the drive mechanism in the tape drive engages the reel hub. Although this design is advantageous because the lock is not released until the drive mechanism engages the reel hub, a substantial amount of vertical travel is required to disengage the mating gears in a robust lock.

SUMMARY OF THE INVENTION

Accordingly, the present invention is directed to a tape cartridge having a reel lock in the hub that is capable of releasing the reel at the same time the drive mechanism engages the hub while minimizing the vertical travel necessary to provide a robust lock. The cartridge of the present invention includes a housing and a tape reel in the housing. A tape drive interface on the reel, usually a circular gear on the reel hub, is accessible to the drive mechanism on a tape drive through a hole in the bottom of the housing. An arm is mounted in the hub. The arm moves between a first position in which the arm engages the housing to prevent the reel from rotating in at least one direction, and a second position in which the arm does not engage the housing and the reel is free to rotate in both directions. In one embodiment of the invention, the arm engages a round post connected to or integral with the top of the housing. The post projects into the hub and has teeth along at least a portion of its perimeter. One end of the arm is made to engage the teeth to lock the reel. The other end of the arm extends into the tape drive interface gear on the bottom of the hub so that, as the tape drive engages the hub gear, it also engages and pivots the arm to release the tab from the teeth on the post and unlock the reel. In another embodiment, an annular ring is used in place of the round post. The teeth are formed along the interior wall of the ring. As with the round post embodiment, one end of the arm engages the teeth in the ring to lock the reel and the other end extends into the interface gear. In both embodiments, the arm is biased to the locked positioned using a spring or other suitable biasing mechanism.

DETAILED DESCRIPTION OF THE INVENTION

Figure 1:
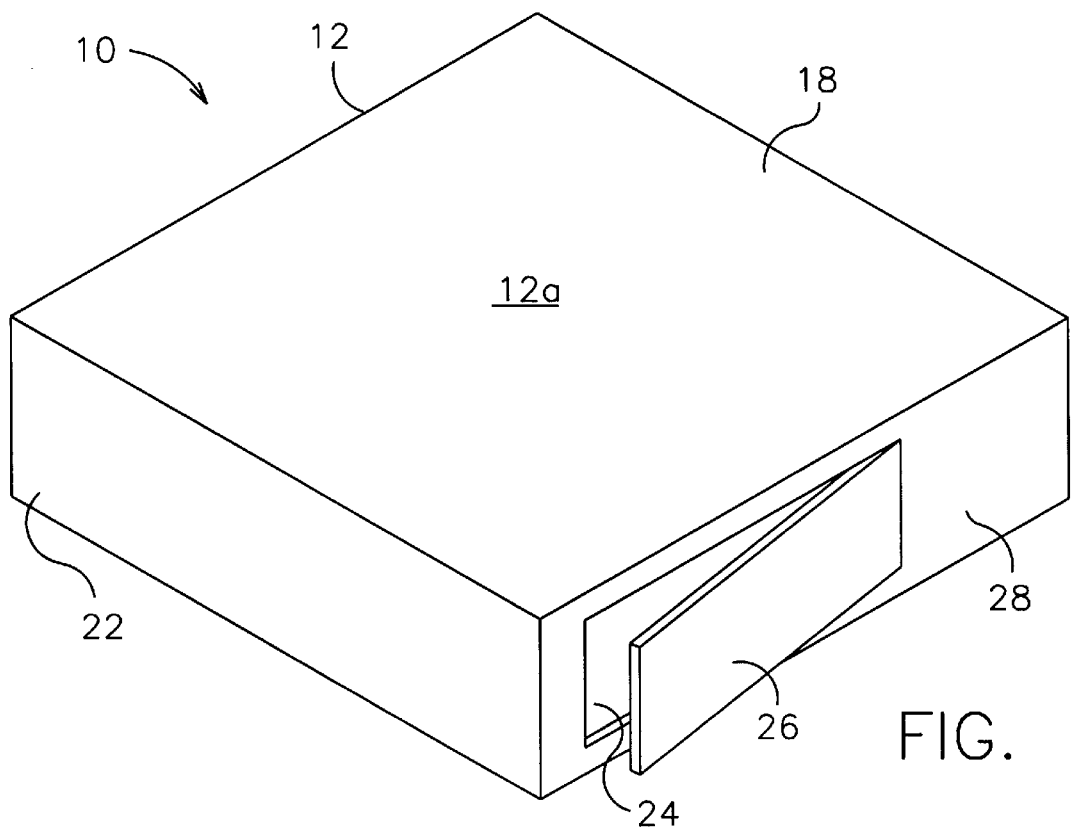
FIG. 1 is a perspective top side view of a single supply reel tape cartridge.
Figure 2:
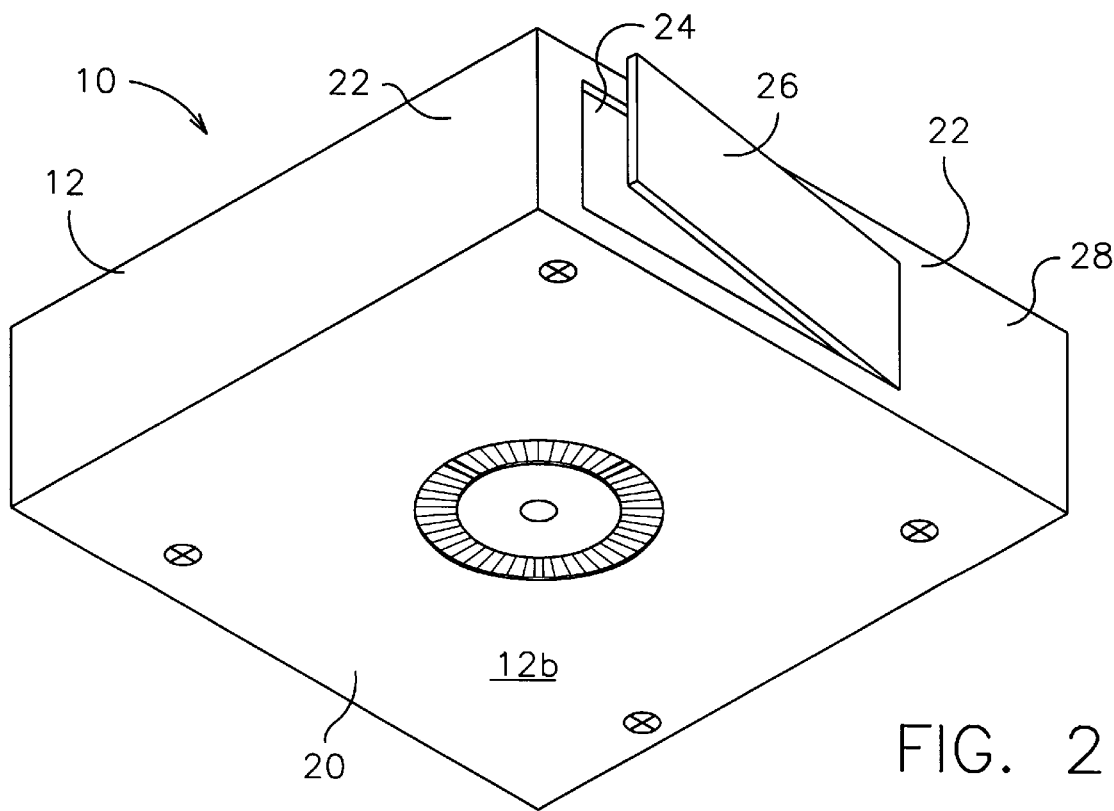
FIG. 2 is a perspective bottom side view of the single supply reel tape cartridge of FIG. 1.
Figure 3:
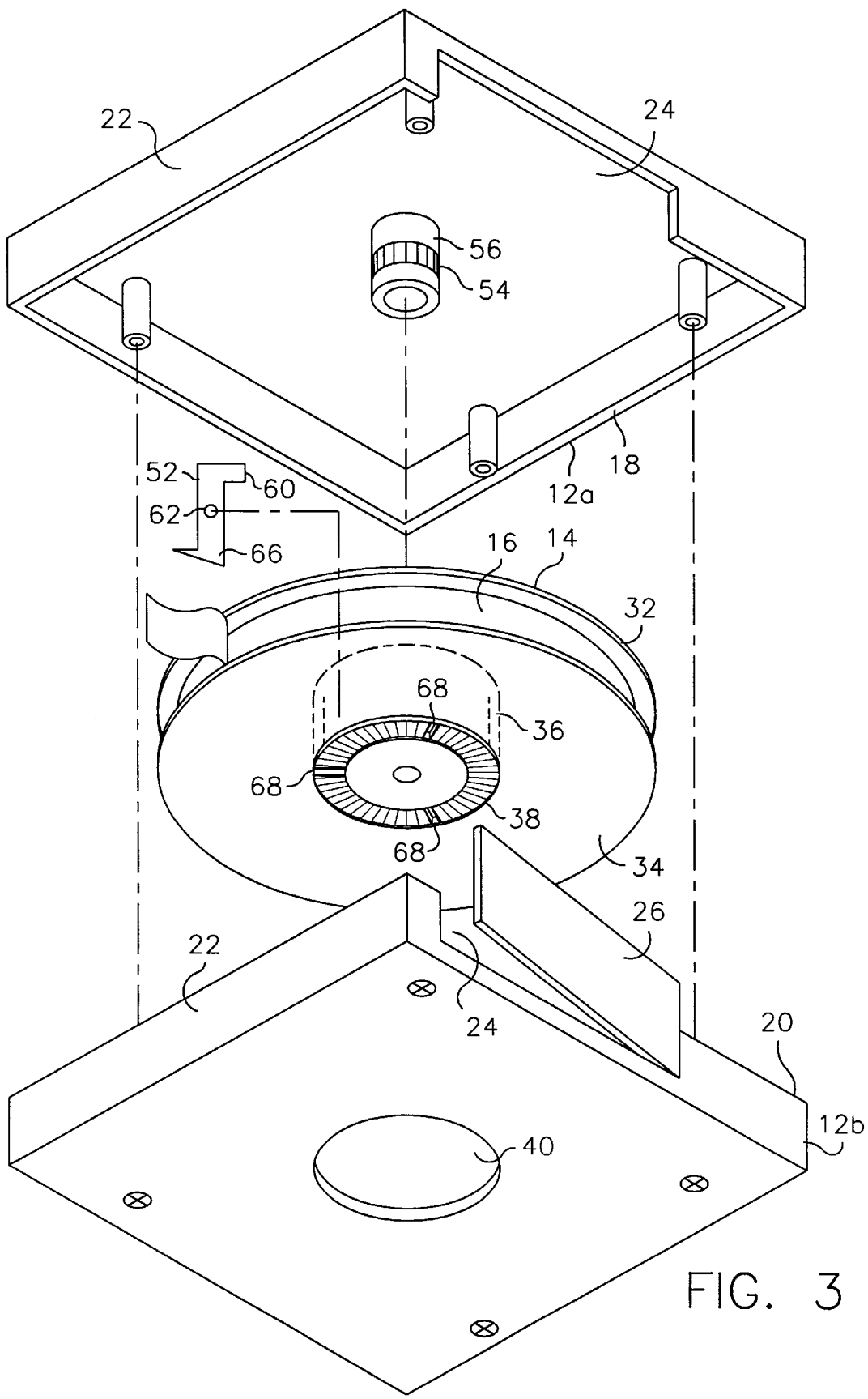
FIG. 3 is an exploded view of the tape cartridge of FIGS. 1 and 2 showing one embodiment of the reel lock.

Referring to FIGS. 1–3, a single reel tape cartridge 10 includes a housing 12, a tape supply reel 14 and tape 16. Housing 12 is a rectangular box-like structure configured to enclose a single reel of tape. Housing 12 is usually formed of plastic molded into two segments—a cover segment 12a and a base segment 12b. To better illustrate the invented reel lock, however, housing 12 will be described with reference to a top section 18, an opposing parallel bottom section 20 and sidewalls 22 extending between the top and bottom sections 18 and 20. Tape 16 is accessible to a tape drive (not shown) through access window 24. A door 26 covers access window 24 when cartridge 10 is not installed in a tape drive.

Figure 4:
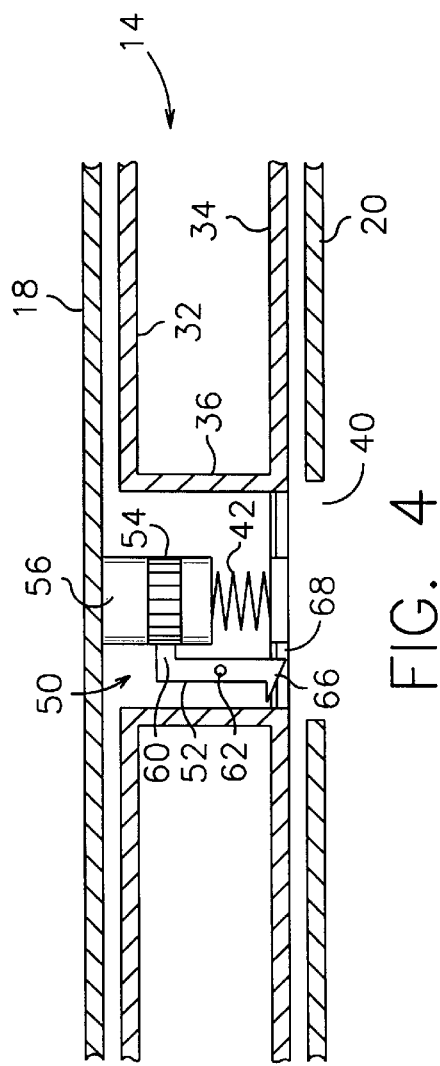
FIG. 4 is a partial cross section view of the central hub portion of the cartridge of FIGS. 1–3.

Referring to FIGS. 3 and 4, tape reel 14 includes disc shaped top and bottom flanges 32 and 34 and an annular hub 36. A circular hub gear 38 is positioned at the bottom of hub 36. Hub gear 38 is the operative interface between the tape drive and the cartridge. Hub gear 38 is engaged by a mating coaxial gear in the drive mechanism of a tape drive. Hub gear 38 is accessed by the tape drive through an opening 40 in the bottom 18 of housing 12. Although hub gear 38 is usually formed as an integral part of reel hub 36, it may be constructed as a discrete component operatively connected to reel hub 36.

Figure 6:
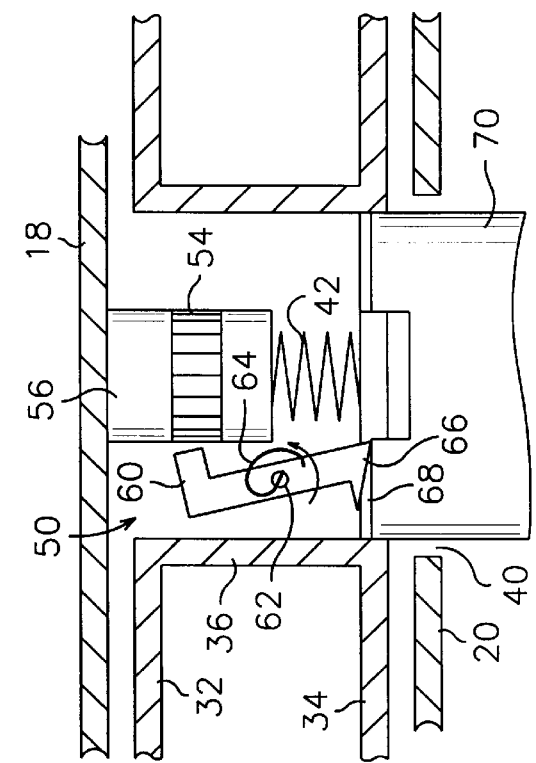
FIGS. 5 and 6 are detail cross section views of the hub portion of the reel. The reel is locked in FIG. 5 and unlocked in FIG. 6.
Figure 5:
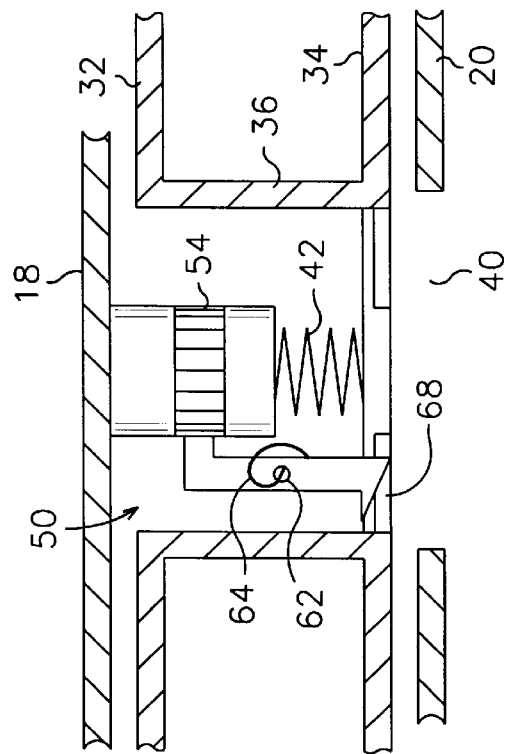

Referring to FIGS. 4–6, reel lock 50 includes arms 52 positioned at spaced apart locations around the inside of reel hub 36. Only one arm 52 is shown in the section views of FIGS. 4–8. It is expected that three arms spaced at equal intervals around hub 36 will be sufficient in most applications for robust locking. The position of the openings 68 through which the bottom portion 66 of three arms 52 extend in the hub gear 38 are shown in FIG. 3. Arms 52 are operative to engage a series of teeth 54 in a stop 56. In the embodiment illustrated in FIGS. 4–6, stop 56 is a round post formed as an integral part of, and projects down from, the top 18 of housing 12. Other types of stops may be used. For example, the stop may be constructed as a recessed cyclindrical post as shown in FIG. 7 or an annular ring with internal teeth as shown in FIG. 8.

A coil spring 42 positioned between stop 56 and tape reel 14, or another suitable biasing mechanism such as the magnetic pre-load of the IBM 3480 cartridge, urges reel 14 down against the bottom of housing 12. This biasing mechanism, therefore, also supplies a reactive force to urge hub gear 38 against drive gear 70 when cartridge 10 is installed in a tape drive. Teeth 54 are formed in and extend around the circumferential perimeter of stop 56. A top portion 60 of arm 52 engages teeth 54 when reel lock 50 is in the locked position. FIG. 5 shows reel lock 50 in the locked position. FIG. 6 shows lock 50 in the unlocked position. Top portion 60 may function as a dog to prevent reel 14 from rotating in either direction. Or, top portion 60 may function as a pawl to prevent reel 14 from rotating in only one direction, preferably to prevent tape 16 unwinding on reel 14.

Arm 52 is mounted to a pivot pin 62 formed in and projecting out from the interior side wall 64 of reel hub 36. Arm 52 pivots on pin 62 so that top portion 60 can engage and disengage stop 56 and thereby lock and unlock reel 14. A torsional spring 64 urges top portion 60 into teeth 54 to bias reel lock 50 in the locked position. A bottom portion 66 of arm 52 projects through openings 68 (shown in FIG. 3) in hub gear 38. Bottom portion 66 is beveled so that arm 52 pivots on pin 62 as tape drive gear 70 engages hub gear 38 and lifts bottom portion 66 of arm 52.

Figure 7:
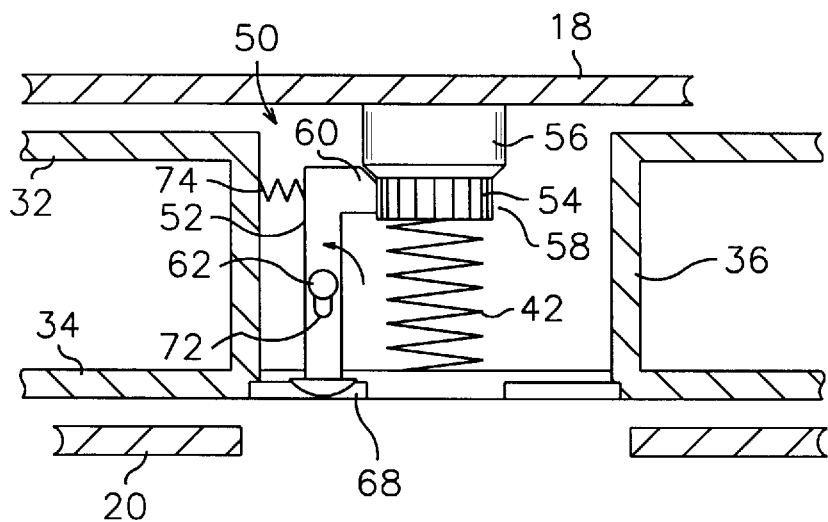
FIG. 7 is a detail cross section view of the hub portion of the reel illustrating a second embodiment of the reel lock.
Figure 8:
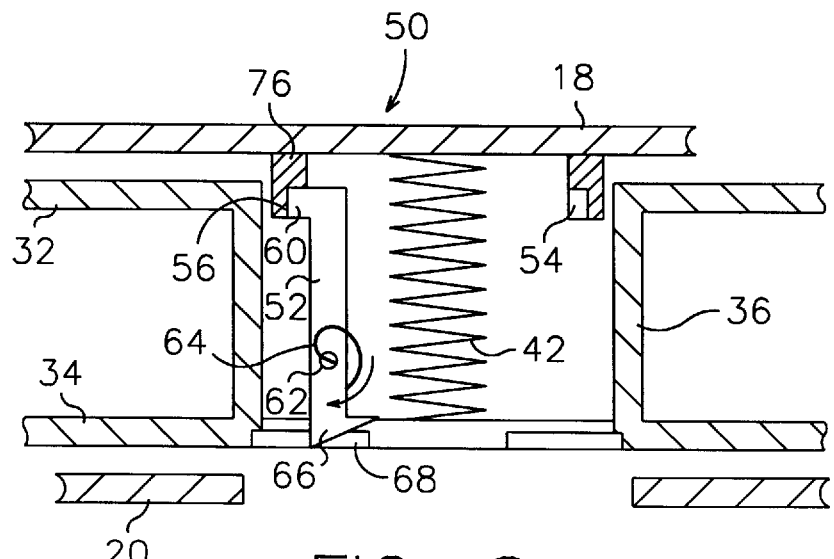
FIG. 8 is a detail cross section view of the hub portion of the reel illustrating a third embodiment of the reel lock.

In a second embodiment of the reel lock 50 illustrated in FIG. 7, teeth 54 are formed in a recess 58 in stop 56, the bottom portion 66 of arm 52 is rounded and recess 58 and top portion 60 are beveled. In this embodiment, the mating bevels on recess 58 and top portion 60 make arm 52 pivot as the drive gear 70 lifts arm 52 to release reel lock 50. Pivot pin 62 slides in a slot 72 formed in arm 52 to accomodate the vertical travel of arm 52. A compression spring 74 between arm 52 and hub 36 urges top portion 60 into teeth 56 to bias reel lock 50 in the locked position.

In a third embodiment illustrated in FIG. 8, stop 56 is constructed as an annular ring 76 that projects down from the top 18 of housing 12. Teeth 54 are formed along the interior wall in ring 76. Arm 52 pivots toward the inside of hub 36 to unlock the reel. In this embodiment, pivot pin 62 is positioned below the center of arm 52 to amplify the movement of top portion 60 relative to the bottom portion 66 of arm 52. The position of pivot pin 62 is used to control the relative movement of top portion 60 and bottom portion 66. It is expected that in most applications pivot pin 62 will be positioned low so that a small displacement of bottom portion 66 translates into a comparatively large movement of top portion 60.

"Teeth" means any sharp angled, rounded or other combination of protrusions and indentations. Preferably, top portion 60 of arm 52 would possess one or more similarly or complimentary shaped teeth to engage teeth 54 in stop 56.

The invention as shown and described in these illustrative embodiments includes the steps and structures necessary for understanding and explaining the structure and use of the invention. Other typical steps and structures that are normally related to the use of a tape cartridge that are well known to one skilled in the art but that are not essential to understanding the invention are not described in detail. Although the reel lock of the present invention has been described with reference to a single reel tape cartridge such as the one illustrated in FIG. 1, the lock may be used in various other types of tape cartridges in which the drive mechanism in the tape drive or tape player engages the reel (or both reels in a dual reel cartridge) to move the tape. Also, arm 52 could be mounted in the hub to slide radially to lock and unlock the reel, rather than using the pivot mount shown and described above. The pivot mount, however, is advantageous because of the ease with which the length of the lever arms may be varied to control the relative movement of the ends of the locking arm 52. It will, therefore, be understood that these and other modifications and variations are possible without departing from the scope of the invention as expressed in the following claims.

What is claimed is:

1. A tape cartridge, comprising:

a housing having a first section and an opposing second section, the second section of the housing having an opening therein;

a reel rotatable disposed in the housing, the reel having a hub and a plurality of spaced apart parallel flanges extending out from the hub;

a tape drive interface on the reel, the tape drive interface accessible through the opening and operative to couple the reel to a tape drive so that the tape drive can rotate the reel in the housing;

an arm moveably mounted in the hub, the arm operative between a first position in which the arm engages the housing to prevent the reel from rotating in at least one direction and a second position in which the arm does not engage the housing and the reel is free to rotate in both directions; and a stop connected to the first section of the housing, the stop projecting into the hub and wherein the arm engages the stop when the arm is in the first position and the arm does not engage the stop when the arm is in the second position.

2. A tape cartridge, comprising:

a housing having a first section and an opposing second section, the second section of the housing having an opening therein;

a reel rotatably disposed in the housing, the reel having a hub and a plurality of spaced apart parallel flanges extending out from the hub;

a gear operatively connected to the reel hub, the gear accessible through the opening and operative to couple the reel to a tape drive so that the tape drive can rotate the reel in the housing; and an arm moveably mounted in the hub, the arm operative between a first position in which the arm engages the housing to prevent the reel from rotating in at least one direction and a second position in which the arm does not engage the housing and the reel is free to rotate in both directions.

3. A cartridge according to claim 2, wherein the gear is integral to the reel hub.

4. A tape cartridge, comprising:

a housing having a first section and an opposing second section, the second section of the housing having an opening therein;

a reel rotatably disposed in the housing, the reel having a hub and a plurality of spaced apart parallel flanges extending out from the hub;

a round post on the first section of the housing, the post projecting into the hub and the post having teeth along at least a portion of its perimeter;

a tape drive interface on the reel, the tape drive interface accessible through the opening and operative to couple the reel to a tape drive so that the tape drive can rotate the reel in the housing; and an arm moveably mounted in the hub, the arm having a first portion and a second portion, the second portion extending into the tape drive interface, the arm operative between a first position in which the top portion engages the teeth on the post to prevent the reel from rotating in at least one direction and a second position in which the top portion does not engage the teeth on the post and the reel is free to rotate in both directions.

5. A cartridge according to claim 4, wherein the arm is pivotably mounted in the hub.

6. A cartridge according to claim 4, wherein the tape drive interface comprises a gear operatively connected to the reel hub and the second portion of the arm extends into an opening in the gear.

7. A cartridge according to claim 4, further comprising a biasing element urging the top portion of the arm into the teeth on the post.

8. A tape cartridge, comprising:

a housing having a first section and an opposing second section, the second section of the housing having an opening therein;

a reel rotatably disposed in the housing, the reel having a hub and a plurality of spaced apart parallel flanges extending out from the hub;

an annular ring on the first section of the housing, the ring projecting into the hub and the ring having teeth along at least a portion of its interior wall;

a tape drive interface on the reel, the tape drive interface accessible through the opening and operative to couple the reel to a tape drive so that the tape drive can rotate the reel in the housing; and an arm moveably mounted in the hub, the arm having a first portion and a second portion, the second portion extending into the tape drive interface, the arm operative between a first position in which the top portion engages the teeth in the ring to prevent the reel from rotating in at least one direction and a second position in which the top portion does not engage the teeth in the ring and the reel is free to rotate in both directions.

9. A cartridge according to claim 8, wherein the arm is pivotably mounted in the hub.

10. A cartridge according to claim 8, wherein the tape drive interface comprises a gear operatively connected to the reel hub and the second portion of the arm extends into an opening in the gear.

11. A cartridge according to claim 8, further comprising a biasing element urging the top portion of the arm into the teeth in the ring.

* * * * *